O. KIRSCHKE.
MACHINE FOR CUTTING THREADS ON WOOD SCREWS.
APPLICATION FILED APR. 1, 1909.
977,527.
Patented Dec. 6, 1910.
3 SHEETS—SHEET 1.
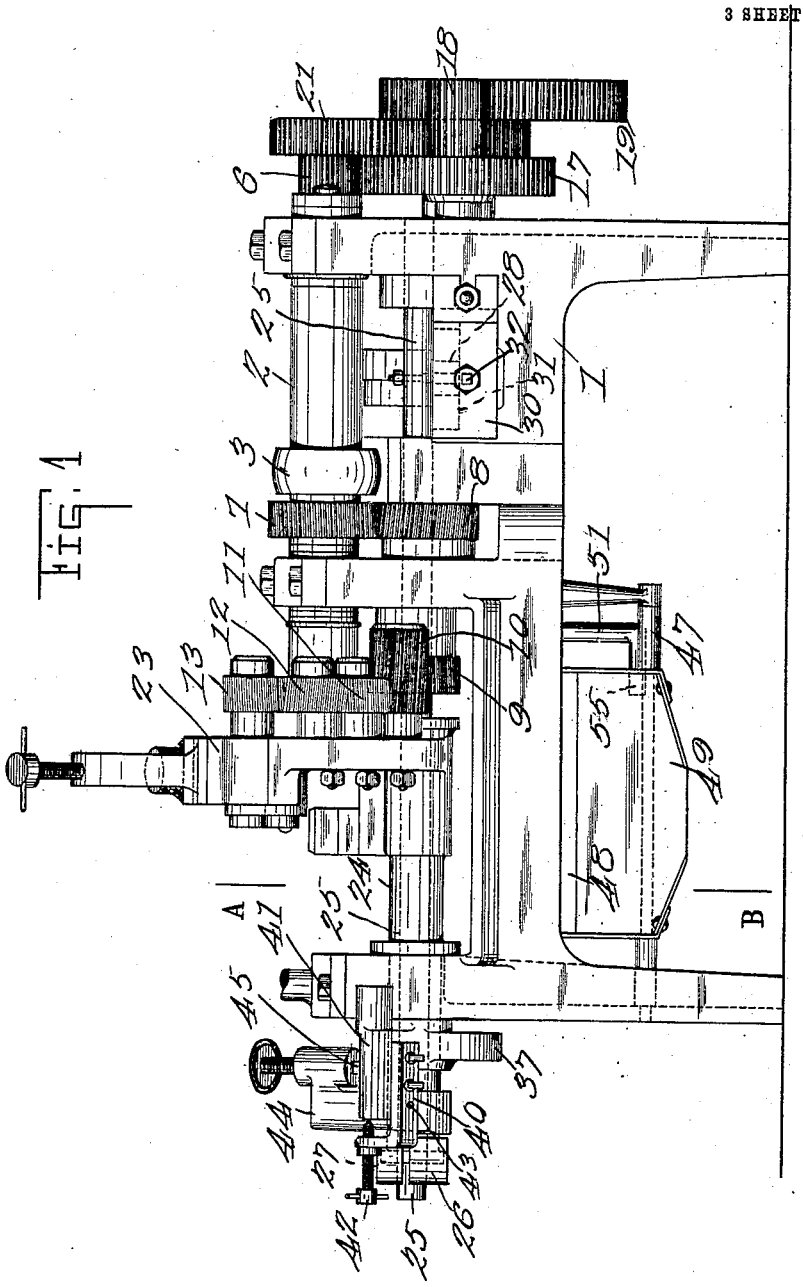
WITNESSES
Georg Beckert
Paul Bachhofer
INVENTOR
Otto Kirschke
by B. Singer
Atty

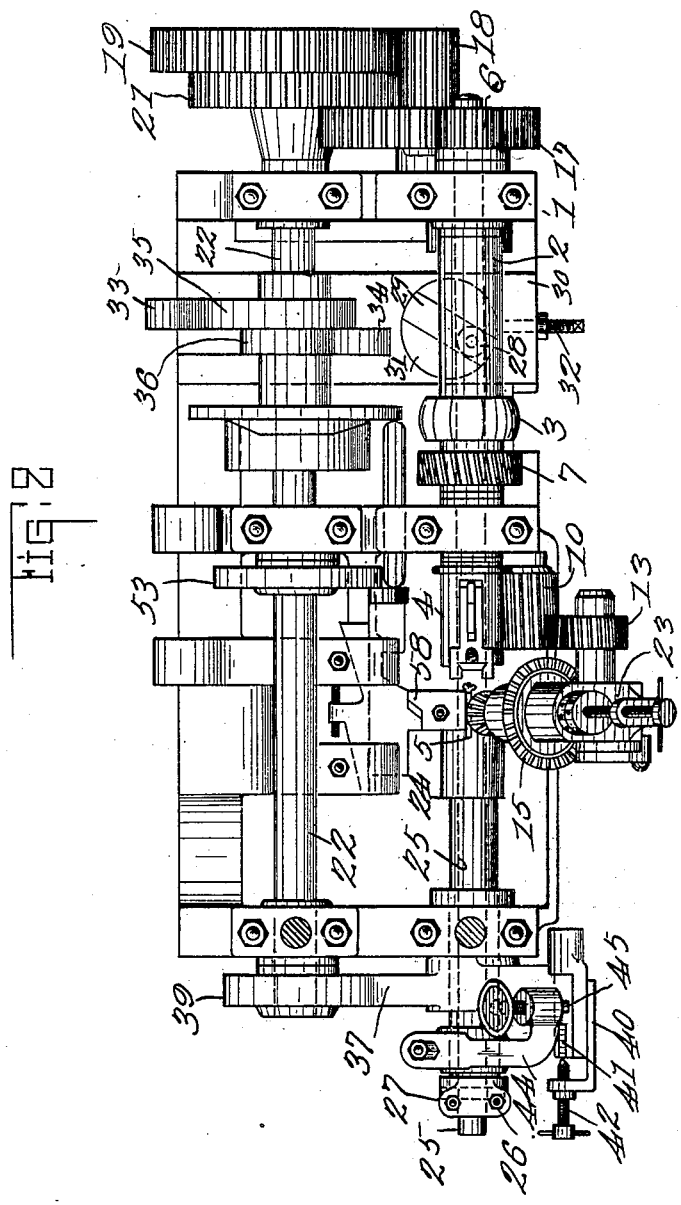

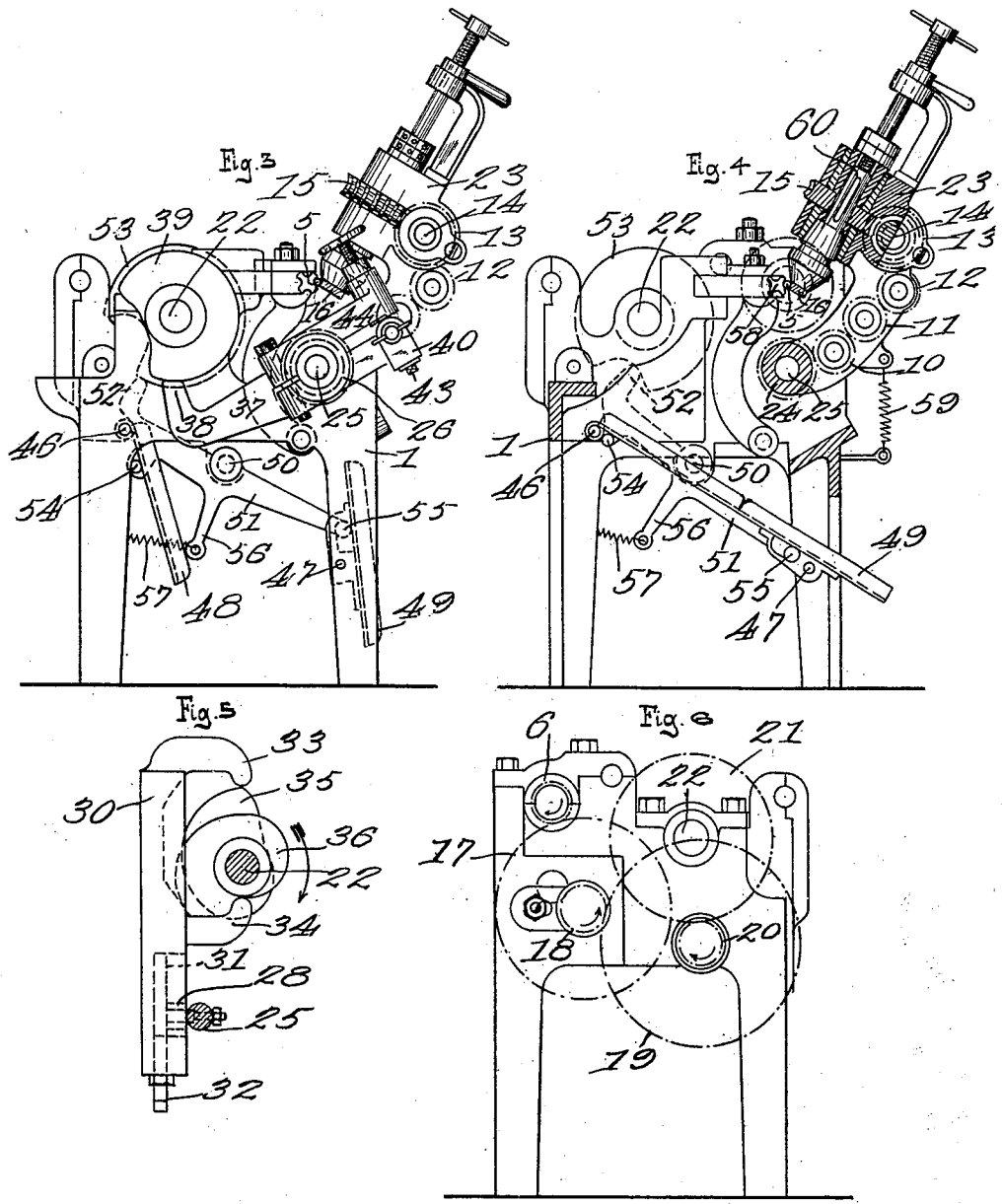

UNITED STATES PATENT OFFICE.

OTTO KIRSCHKE, OF NUREMBERG, GERMANY, ASSIGNOR TO THE FIRM OF J. G. KAYSER, OF NUREMBERG, GERMANY.

MACHINE FOR CUTTING THREADS ON WOOD-SCREWS.

977,527. Specification of Letters Patent. Patented Dec. 6, 1910.

Application filed April 1, 1909. Serial No. 487,246.

*To all whom it may concern:*

Be it known that I, OTTO KIRSCHKE, whose post office address is No. 1 Sybelstrasse, Nuremberg, Bavaria, Germany, have invented certain new and useful Improvements in Machines for Cutting Threads on Wood-Screws; and I do hereby declare the following to be a full, clear, and exact description of the invention, such as will enable others skilled in the art to which it appertains to make and use the same.

This invention relates to a machine for cutting threads on wood screws, and its chief feature is that the cutting tool is mounted and moved in a specially suitable manner.

The invention is shown by way of example in the accompanying drawings, in which—

Figure 1 is a front elevation of the machine, Fig. 2 a plan view, and Fig. 3 a side elevation of Fig. 1 seen from the left. Fig. 4 is a section on the line A—B of Fig. 1. Fig. 5 is a detailed view of the slide, and Fig. 6 a side elevation of Fig. 1 seen from the right.

The shaft 2 is rotatably mounted in the machine frame 1 which shaft is driven by the belt pulley 3. The shaft 2, carries the jaws 4, which serve for holding the piece of work 5. The construction of these jaws as well as their function is known and need not be described here. Moreover the apparatus by means of which the various screw bolts are taken from a receptacle and fed to the jaws has been omitted in the drawings as having no bearing on the invention.

Two toothed wheels 6 and 7 are mounted on the shaft 2, of which the toothed wheel 7 rotates the tool 16 by means of the toothed wheels 8, 9, 10, 11, 12 and 13 the worm 14, and the worm wheel 15, while the toothed wheel 6 by means of the toothed wheels, 17, 18, 19, 20 and 21 drives the cam shaft 22.

The rotating tool 16 is rotatably and approximately mounted in an arm 23, and is directly driven by the worm wheel 15. As may be seen from Figs. 3 and 4, the tool 16 acts from the top on the piece of work 5, so that the turnings falling down and the cooling liquid do not damage the tool at the driving parts. The arm 23 carrying the tool 16 is rotatably mounted on a rod 25 by means of a sleeve 24, and is prevented from moving longitudinally by means of a clamping muff or sleeve 26, which is fixed to the rod 25 and loosely incloses the flange 27. The rod 25 extends the whole length of the machine and is provided with a roller 28 which engages in the groove 29 of the disk 31 mounted in the slide 30. The disk 21 is rotatively mounted in the slide 30 and can be fixed by means of the screw bolt 32. The slide 30 is provided with two arms 33 and 34, which are connected with the cams 35 and 36, mounted on the shaft 22. When the shaft 22 is rotated, the slide 30 is moved to and fro in a transverse direction, so causing the rod 25, and consequently the arm 23, carrying the tool, to reciprocate in the longitudinal direction of the machine. The clamping muff or sleeve 26 may be moved and adjusted on the rod 25, with the tool carrier made up of the parts 23 and 24, so as to suit the particular length of the piece of work 5 and may then be fixed once more.

The tool carrier is moved to and from the piece of work by the following arrangement. A double lever 37 is rotatively mounted on the tool holder box 24, outside the machine frame. This double lever is in contact on the one end by means of the extension 38, with the cam disk 39, mounted on the cam shaft 22, and on the other end is provided with a yoke 40, which carries a sliding piece 41. This sliding piece is mounted in the yoke and is adapted to be adjusted in the longitudinal direction by means of the spindle 42 and in the transverse direction by means of the screw bolt 43. An arm 44 is clamped on the tool holder sleeve 24, which arm slides on the sliding piece 41 by means of an adjustable bolt or pin 45. The arm 44 is therefore rigidly connected with the tool holder 23, so that the movement acting on the bolt 45 is transmitted to the tool. Owing to the adjustability of the sliding piece 41, the movement of the tool may be exactly adapted to the cross section of the screw bolt to be cut.

In order to effect a separation of the turnings or cuttings from the finished screw bolts, the following arrangement is provided under the machine. Plates of sheet metal 48 and 49 are so mounted on the shafts 46 and 47, respectively that the two plates may be swung downward when cutting the screw, so forming a wide opening under the machine through which the turnings and cooling liquid may fall or pass while these sheet metal plates form a closed sloping track on which the finished screw may slide down toward the front, see Figs. 3 and 4. The two sheet metal plates are moved by a double lever 51 mounted on the axis 50 and contacting by means of the extension 52, with the cam disk 53, mounted on the shaft 22 and which lever moves or swings the two sheet plates, 48 and 49 by means of the arms 54 and 55. The double lever 51 is returned by a helical spring 57, secured to the arm 56.

The screw bolt 5 held by the jaws 4 is assisted and supported in a known manner during the cutting by a counter bearing 58.

The machine hereinbefore described works as follows: The belt pulley 3 mounted on the shaft 2 directly drives the jaws 4 holding the screw bolt 5 while the tool is rotated by means of the toothed wheel transmission gear 8—15 and the toothed wheel transmission gear 6 and 17—21 rotates the shaft 22. The tool 16 is arranged at the point or tip of the screw bolt and is guided along the bolt by means of the feeding or pushing device 28—36, by the movement of the rod 25. By doing this the bolt 45 of the arm 44 firmly connected with the tool holder slides along the sliding piece 41 thus guiding the tool 16. The cam disk 39, according to requirements lowers or raises the double lever 37, carrying the sliding piece 41 and moves the tool holder to or away from the work. The cam disk 39 is so adjusted that the tool when cutting the thread is pressed against the work by the double lever 37 and by the arm 44 and during the inoperative stroke or travel, that is during the return movement of the tool into the initial position, is moved away from the work owing to the recess in the said disk. The tool is moved away from the work in consequence of its weight and is further assisted by the helical spring 59. The turnings or cuttings produced during the cutting process and the cooling liquid pass down the sheet metal plate 48 under the machine (see Fig. 3). After the thread has been cut the counter bearing 58 returns in a known manner, jaws 4 open, the finished screw falls out and a new screw to be cut is inserted in the jaws by a known device. In the meantime the two plates 48 and 49 have been moved into the inclined or sloping position shown in Fig. 4, so that the screw dropping off falls out in front. After the counter bearing 58 has moved up to the new bolt again and a pointed knife usually employed has initially cut the point of the bolt, the rotating cutting tool 16 has already reached the end point of the bolt 5 and is now again caused by the lever 37 and the arm 44 to approach or move up to the screw bolt. Owing to the inclined surface of the rail or sliding piece 41, the tool is guided as far as the center of the screw bolt in order to cut first of all the point or tip and thereafter finish cutting the screw.

The rotating tool 16 is clamped in a known manner in the sleeve 60 and is driven by the worm wheel 15 as already mentioned.

The worm 14 driving the worm wheel 15 rotates at the same speed as the spindle 2 and consequently also at the same speed as the screw bolt 5 held by the jaws 4. The worm wheel has a few teeth more than the tool 16 rotated by it. As the tool and the work have also to coöperate after the manner of a worm gear, and as however the tool 16 has a few teeth less than the worm wheel 15, driving it, the tool in order to make good or equalize the difference, must slide along the piece of work at a certain speed beside rotating thus making the cutting of the thread possible. If the tool were to have the same number of teeth as the worm wheel 15, then a mere worm transmission gear between tool and bolt would exist and it would be impossible to cut the thread.

What I claim and desire to secure by Letters Patent is:

1. A machine for making wood screws comprising in combination, means for holding and rotating the work, a tool holder, a cam shaft, a longitudinally reciprocating rod carrying said holder, a slide angularly disposed with respect to said rod and reciprocated by said cam shaft, and an adjustable disk on said slide provided with a groove, said rod having a roller engaging said groove.

2. A machine for making wood screws comprising in combination, means for holding and rotating the work, a tool holder, a sleeve on which said holder is mounted, a longitudinally reciprocable rod supporting said sleeve, means for reciprocating said rod, and means connecting said sleeve with said rod to permit oscillation of the sleeve and prevent longitudinal movement of the sleeve with respect to said rod.

3. A machine for making wood screws comprising in combination, means for holding and rotating the work, a tool holder, a sleeve on which said holder is mounted, a rod for reciprocating said sleeve, means for reciprocating said rod, said sleeve having an arm provided with an adjustable screw 45, a rocking lever provided with an adjustable inclined rail engaging said screw for moving the tool holder toward and away from said work.

4. In combination with a machine for making wood screws, of means for operating said machine, a plurality of pivotally mounted plates beneath the work operated on by the machine and normally swung apart from each other, and a device operated by said means on completion of the work for swinging said plates together to form a slide, substantially as and for the purpose set forth.

In testimony whereof I affix my signature in presence of two witnesses.

OTTO KIRSCHKE.

Witnesses:
    AUSANDER WIELE,
    MAX SCHNEIDER.